United States Patent
Kalhan

(10) Patent No.: US 11,606,182 B2
(45) Date of Patent: Mar. 14, 2023

(54) TRANSMISSIONS WITH COMMON LOCATION DEPENDENT CONTROL INFORMATION FOR MACHINE TYPE COMMUNICATION (MTC) DATA AND MOBILE BROADBAND USER EQUIPMENT (UE) DATA

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 370 days.

(21) Appl. No.: 16/339,115

(22) PCT Filed: Oct. 17, 2017

(86) PCT No.: PCT/US2017/056910
§ 371 (c)(1),
(2) Date: Apr. 3, 2019

(87) PCT Pub. No.: WO2018/075472
PCT Pub. Date: Apr. 26, 2018

(65) Prior Publication Data
US 2020/0044813 A1    Feb. 6, 2020

Related U.S. Application Data

(60) Provisional application No. 62/410,966, filed on Oct. 21, 2016.

(51) Int. Cl.
*H04M 7/00* (2006.01)
*H04L 5/00* (2006.01)
(Continued)

(52) U.S. Cl.
CPC .......... *H04L 5/0069* (2013.01); *H04L 5/0007* (2013.01); *H04L 5/0037* (2013.01);
(Continued)

(58) Field of Classification Search
CPC ................. H04W 4/005; H04W 4/70; H04W 28/0215; H04B 7/18582; H04M 7/0084; H04N 1/32667; H04Q 3/0079; H04Q 3/54591
See application file for complete search history.

(56) References Cited

U.S. PATENT DOCUMENTS

2013/0100900 A1 * 4/2013 Lee .................... H04W 72/048
370/329
2013/0286918 A1   10/2013 Park et al.
(Continued)

FOREIGN PATENT DOCUMENTS

WO    2016128052 A1    8/2016

OTHER PUBLICATIONS

Fujitsu; "Discussion on Control Signaling for MUST Schemes"; R1-155158, 3GPP TSG RAN WG1 Meeting #82bis, Oct. 5-9, 2015; Malmo, SE.

*Primary Examiner* — Salvador E Rivas

(57) ABSTRACT

A base station transmits a signal transmission to a mobile broadband (MBB) user equipment (UE) device and to a machine type communication (MTC) device that is in close proximity to the MBB UE device where the signal transmission includes control channel and a data channel. The control channel includes common location dependent control information that applies to the MTC device and the MBB UE device because they are at the same location.

20 Claims, 6 Drawing Sheets

(51) Int. Cl.
  *H04W 72/121*  (2023.01)
  *H04W 72/1273*  (2023.01)
  *H04W 72/12*  (2023.01)
  *H04N 1/32*  (2006.01)
  *H04W 4/70*  (2018.01)
  *H04B 7/185*  (2006.01)
  *H04Q 3/00*  (2006.01)

(52) U.S. Cl.
  CPC .......... *H04L 5/0048* (2013.01); *H04L 5/0053* (2013.01); *H04M 7/0084* (2013.01); *H04N 1/32667* (2013.01); *H04W 72/121* (2013.01); *H04W 72/1273* (2013.01); *H04W 72/1289* (2013.01); *H04B 7/18582* (2013.01); *H04Q 3/0079* (2013.01); *H04W 4/70* (2018.02)

(56) References Cited

U.S. PATENT DOCUMENTS

2013/0301552 A1* 11/2013 Xu ................... H04B 7/0413
  370/329
2016/0149677 A1  5/2016 Morioka
2016/0218847 A1* 7/2016 Zheng ................. H04L 41/0806
2017/0332359 A1* 11/2017 Tsai ................... H04L 5/0053

* cited by examiner

US 11,606,182 B2

TRANSMISSIONS WITH COMMON LOCATION DEPENDENT CONTROL INFORMATION FOR MACHINE TYPE COMMUNICATION (MTC) DATA AND MOBILE BROADBAND USER EQUIPMENT (UE) DATA

CLAIM OF PRIORITY

The present application claims priority to Provisional Application No. 62/410,966, entitled "RESOURCE SHARING BETWEEN THE MTC DATA AND THE MBB DATA FOR SINGLE-USER MULTI-DEVICES SCENARIO", filed Oct. 21, 2016, assigned to the assignee hereof and hereby expressly incorporated by reference in its entirety.

FIELD

This invention generally relates to wireless communications and more particularly to devices and methods for transmitting a signal to a MTC device near a mobile broad band (MBB) user equipment (UE) device.

BACKGROUND

In conventional communication systems, base stations transmit signals to multiple devices within a service area where each device receives unique control information based on its specific geographical location. Some examples of control information that is dependent on the geographical location of the UE device include parameters related to multiple input multiple output (MIMO) antenna. In some situations, modulations coding scheme (MCS) parameters may also be dependent on location. Generally, the MIMO and MCS parameters are based on the channel conditions feedback from the UE device and the directional aspects of the transmissions are based on the location of the UE relative to the transmitter.

Machine type communication (MTC) is a form of data communication which involves one or more entities that do not necessarily need human interaction. Depending on the particular implementation, an MTC device may communicate with one or more servers or with other devices. The network operator provides network connectivity to MTC server(s) regardless of whether the MTC server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

SUMMARY

A base station transmits a signal transmission to a mobile broadband (MBB) user equipment (UE) device and to a machine type communication (MTC) device that is in close proximity to the MBB UE device where the signal transmission includes control channel and a data channel. The control channel includes common location dependent control information that applies to the MTC device and the MBB UE device because they are at the same location.

DETAILED DESCRIPTION

In certain situations, a MTC device is at the same location as a mobile broadband (MBB) user equipment (UE) device. Such situations may occur where the two devices are associated with the same user and may be being used at the same time. For example, a user may be watching a video on a smartphone and listening to the associated audio stream on a headset. In the recent years more and more users use multiple devices for different purposes. For example, a user carries a smartphone, a tablet and a smartwatch and each device has wireless connectivity. All these devices independently connect to the network to perform different functions. As the number of devices connected to the network increases the traffic-load increases as well as the management of these devices increases. In order to provide efficient wireless services to the multiple devices used by the same user there is a need to reduce the amount of spectrum-resources and control-signaling.

The techniques discussed herein take advantage of the proximity of the MTC device to the MBB UE device by transmitting a signal that includes MTC data "punctured" within the UE data and transmitting a common control message that comprises common geographical dependent control data that is generated by the base station based on the geographical location of the two devices. The two devices are near enough to each other that the geographical dependent control information that applies to the MBB UE device can be applied to the MTC device to successfully receive the data signal. The control message also includes device specific control information that allows each device to recover the data directed to that device. Therefore, a MBB UE device and a MTC device receive the same data signal and the same control message but recover only the data intended for the device. As a result, communication resources are efficiently utilized since the same spatial communication resources are used to transmit data to both devices while transmitting control information that applies to both devices receiving the data channel. In some situations, feedback information from only one of the devices may be applied to setting transmission, modulation, coding rate, and timing parameters for the transmission. For example, feedback related to timing alignment (TA) may be received at the base station from the MBB UE device and assumed to be accurate for the MTC device receiving the transmission from the base station.

Figure 1:
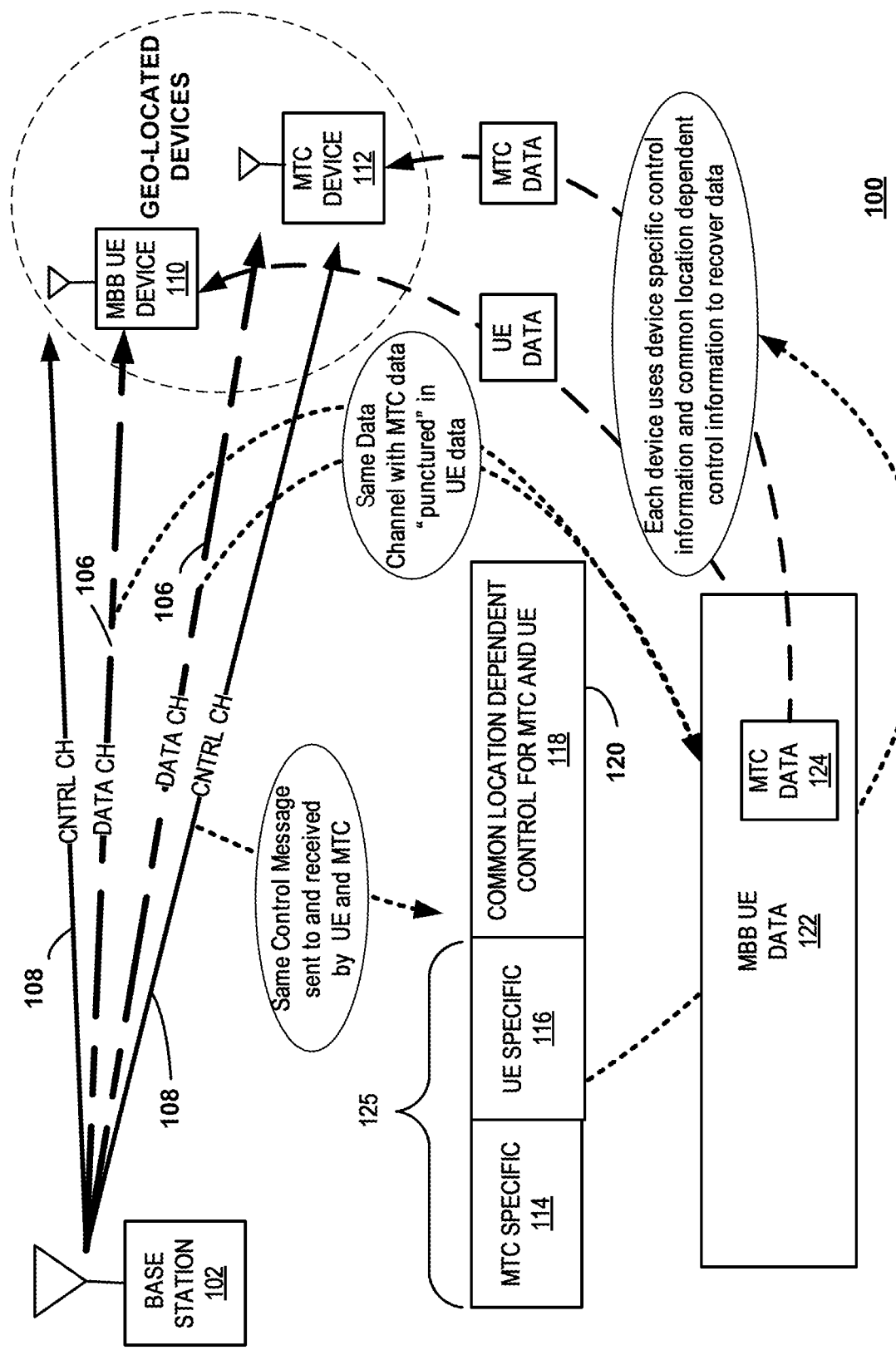
FIG. 1 is a block diagram of a communication system with a base station transmitting a signal transmission over a data channel and a control channel directed to an MBB UE device and an MTC device located near the MBB UE device.

FIG. 1 is a block diagram of a communication system 100 with a base station 102 transmitting a signal transmission 104 over a data channel 106 and a control channel 108 directed to an MBB UE device 110 and an MTC device 112 located near the MBB UE device 110. For the examples herein, the base station 100 is an eNB, eNodeB, access point, or any other device performing similar tasks in a system otherwise operating in accordance with at least one revision of The Third Generation Partnership Project (3GPP) Long Term Evolution (LTE) specification. The techniques discussed, however, may be applied to other types of systems in some circumstances. The UE device may be a smartphone and the MTC device may be a headset where both devices are being used by a single user. Since the headset is an MTC device, it operates at a much narrower bandwidth than the smart phone and, therefore, transmits and receives signals at the narrower bandwidth.

Control information 114, 116, 118 is transmitted using a plurality of time-frequency communication resources in a control message 120 over the control channel 108. Data 122, 124 is transmitted using a plurality of time-frequency resources in the data channel 106 where the data includes UE data 122 for the UE device 110 and MTC data 124 for the MTC device 112. The MTC data 124 is transmitted using time-frequency resources within a block of time-frequency resources available for the UE data but unused for the UE data for the transmission.

The control message 106 includes a common geographical location dependent control information 116 and device specific control information 125 that facilitates reception of the appropriate data by each device. The common geographical location dependent control information 116 is control information that results, or is otherwise dependent on, the location of the devices 108, 110. Examples of common geographical location dependent control information 106 includes MIMO settings Precoding Matrix Index (PMI), PMI Confirmation bit, Power Offset between PDSCH and RS, DM-RS Scrambling Sequence Index, and Phase-tracking RS Sequence Index. The device specific control information includes additional control information for each device that that allows the associated UE device to recover the data directed to that UE device and may include information such as identification of the time-frequency resources used for data. Therefore, MTC specific control information 114 is directed to the MTC device 112 and UE specific control information 116 is directed to the MBB UE 110 device while the common location dependent control information 118 is directed to both devices. The device specific control information 125 may include the modulation coding scheme (MCS), redundancy version (RV), and new data indicator (NDI).

The base station 102, therefore, transmits the control message 120 over the control channel 108 to the UE device 110 and to the MTC device 112 and transmits the UE data 122 and the MTC data 124 over the data channel 106 to the UE device 110 and the MTC device 112 using the same spatial resources. The UE device 110 receives the control message 120 and applies the common location dependent control information 118 and the UE specific control information 116 to recover the UE data 122. The MTC device 112 receives the control message 120 and applies the common location dependent control information 118 and the MTC specific control information 114 to recover the MTC data 124.

Therefore, the base station transmits a transmission signal to the UE device and the MTC device where the two devices are close enough that at least some of the control information that is dependent on device location is the same. As a result, a signal transmission allows a single control channel and a shared resource allocation to deliver two data stream to an MTC device and MBB UE device where one data stream is delivered to the MTC device that is in close proximity to the MBB UE device.

The transmission signal includes a plurality of data subcarriers conveying UE data for the UE device. A portion of the data subcarriers available, but not used, for the UE data convey MTC data for the MTC device. The transmission signal also includes a plurality of control subcarriers conveying geographic location dependent control information applying to reception of the data subcarriers by the UE device and by the MTC device. In addition to the geographic location dependent control information that applies to both devices, the control subcarriers also convey device specific control information applying to recovery of the UE data from UE data subcarriers and MTC data from the MTC data subcarriers. The device specific control information identifies time-frequency resources conveying the UE data and the time-frequency resources conveying the MTC data. The geographic location dependent control information includes control information that applies to both devices because of their common location and may include parameters such as multiple input multiple output (MIMO) parameters and transmission mode parameters.

In some situations, the MTC data may be in a predetermined format that is known to the MTC device. As a result, the MTC data layer control information may include only limited information formation. In one example, the MTC data layer control information includes only MTC data present indicator indicating that the MTC data is present in the preassigned communication. The MTC control information, therefore, may include a one-bit flag that indicates whether there is MTC data. The predetermined format may include a modulation coding scheme (MCS), a size of the MTC data, and a time-frequency resources of the MTC data. In some situations the predetermined format may also include common spatial resources of the UE data and the MTC data.

Figure 2:
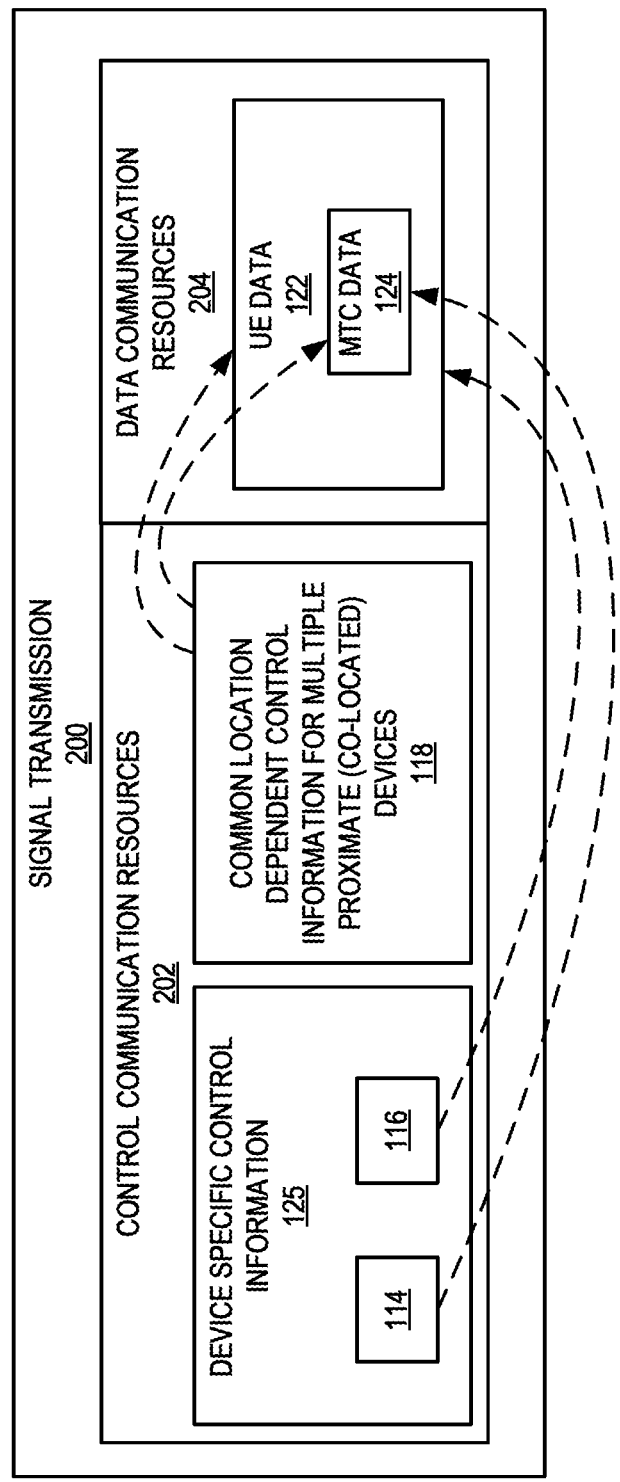
FIG. 2 is block diagram of an example of a signal transmission for the MTC device in proximity to the MBB UE device.

FIG. 2 is block diagram of an example of a signal transmission 200 for the MTC device 112 in proximity to the MBB UE device 110. The transmission signal 200 shares time, frequency and spatial resources to send information to the two devices that are located near each other. The transmission signal 200 includes control communication resources 202 such as time-frequency resource elements that are used to convey the common location dependent control information 118 that applies to both devices 110, 112 and device specific control information 125 that includes at least information for each device regarding the location of the data in the transmission 200. The signal transmission 200 also includes data communication resources such as time-frequency resource elements that are used to convey the UE data 122 and the MTC data 124. Communication resources available for the UE data but unused for the UE data are used for the MTC data 124. Each device 110, 112 uses the common location dependent control information 118 and device dependent information 114, 116 in the device specific control information 125 to recover the data 122, 124 from the data communication resources 204 that is directed to that device. The MTC device is close enough to the UE device that the common control information 118 such as spatial (or directional beamforming) vectors and MIMO parameters are at least similar and, in some situations, the same. In some circumstances, the devices may be within one foot from each other. In other circumstances, the distance between the devices is less than two feet. In still other circumstances, the devices are less than three feet from each other. Other distances between the devices may also be possible depending on the particular system implementation and channel conditions.

Figure 3:
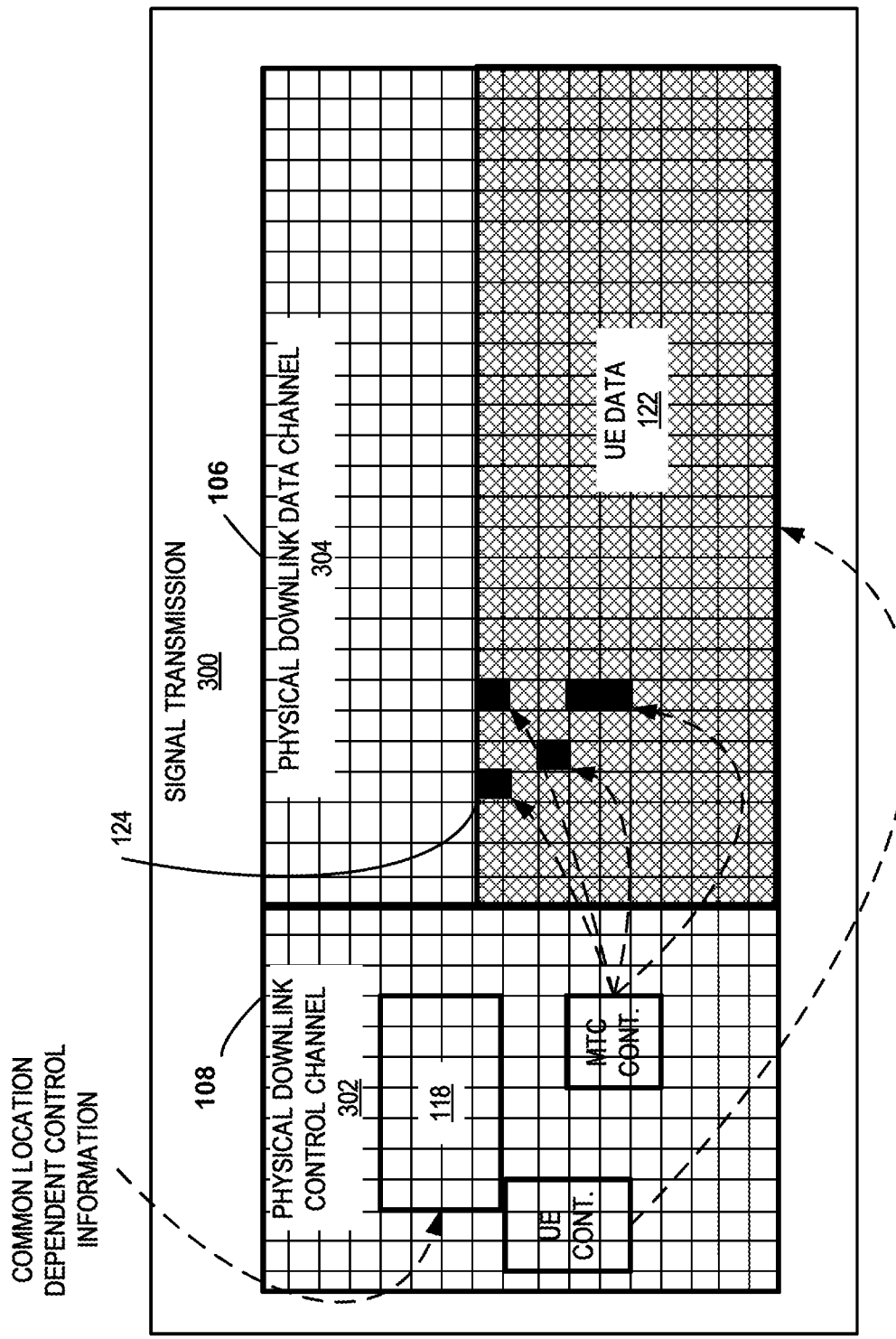
FIG. 3 is an illustration of an example of a signal transmission suitable for transmission in the communication system.

FIG. 3 is an illustration of an example of a signal transmission 300 suitable for transmission in the communication system 100. The signal transmission 300 includes a physical downlink control channel 302 and a physical downlink data channel 304. As discussed below, in some examples, the physical downlink control channel 302 is a Physical Downlink Control Channel (PDCCH) conforming to at least one revision of 3GPP communication specification and the physical downlink data channel 304 is a Physical Downlink Shared Channel (PDSCH) conforming to the revision of 3GPP communication specification. The physical downlink control channel 302 includes time-frequency resources (communication resource elements) that convey the control message and, therefore, includes the device specific control information 125 and the common location dependent control information 118. The physical downlink data channel 304 includes time-frequency resources (communication resource elements) that convey the data 122, 124 and, therefore, includes the UE data 122 and the MTC data 124. Accordingly, the physical downlink control channel 302 is an example of the control channel 108 and the physical downlink data channel 304 is an example of the data channel 106. The MTC data 124 is within the block of communication resource elements used for the UE data 122. The resource elements used for the MTC data are not used for the UE data. Therefore, the MTC data is "punctured" within the UE data. For this example, both devices receive and decode the physical downlink control channel 302 to recover device specific control information and the common location dependent control information 118. The UE device 110 applies the UE specific control information 116 and the common location dependent control information 118 to recover the UE data 122. The MTC device 112 applies the MTC specific control information 114 and the common location dependent control information 118 to recover the MTC data 124.

Figure 4:
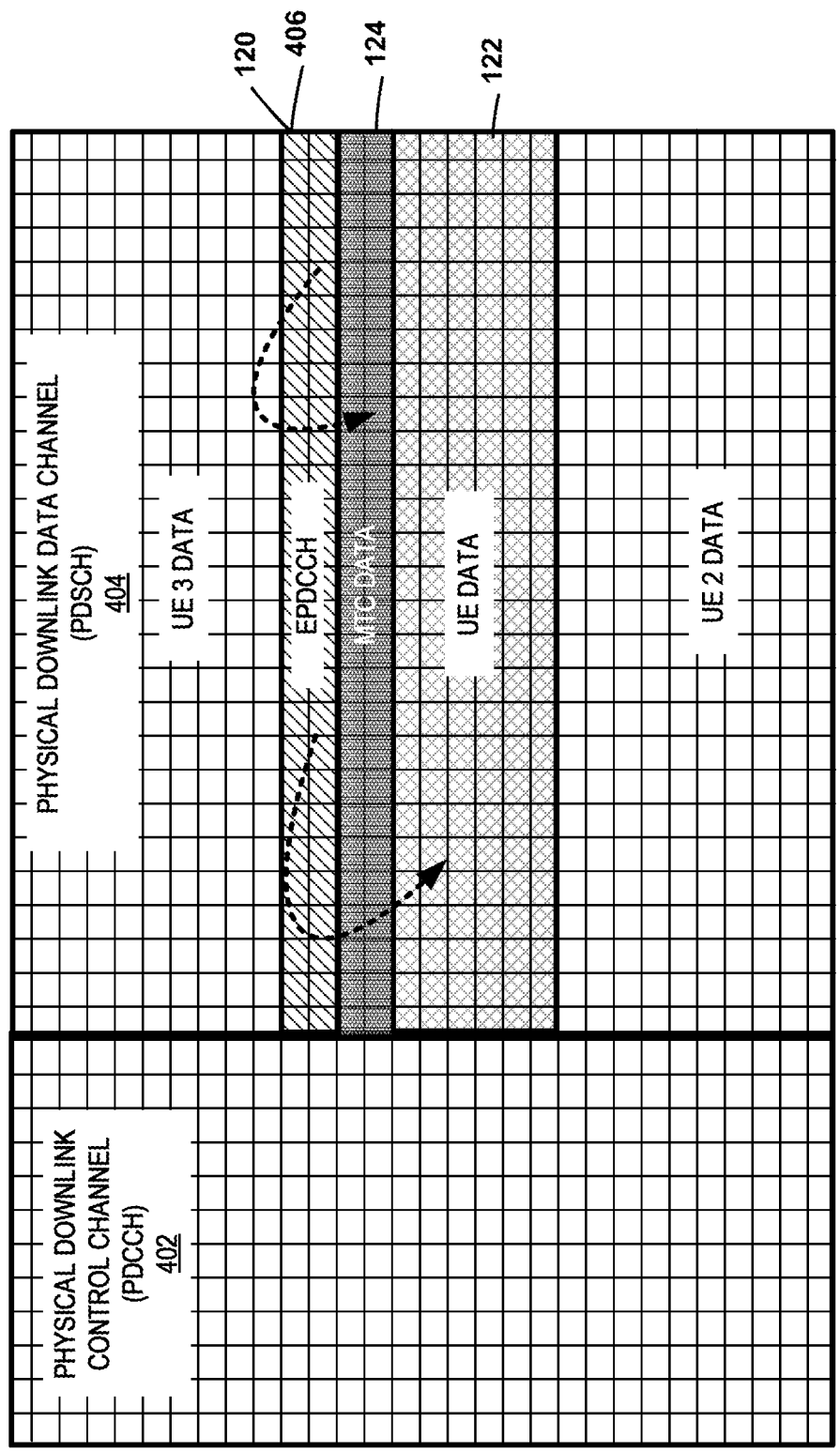
FIG. 4 is an illustration of an example of a signal transmission suitable for transmission in the communication system.

FIG. 4 is an illustration of an example of a signal transmission 400 suitable for transmission in the communication system 100. The signal transmission 400 includes a Physical Downlink Control Channel 402 and a Physical Downlink Shared Channel 404. As discussed above, in some examples, the physical downlink control channel 302 is a Physical Downlink Control Channel (PDCCH) conforming to at least one revision of 3GPP communication specification and the physical downlink data channel 304 is a Physical Downlink Shared Channel (PDSCH) conforming to the revision of 3GPP communication specification. The PDCCH 402 includes time-frequency resources (communication resource elements) that convey control information. For the example of FIG. 4, however, an Enhanced Physical Downlink Control Channel (EPDCCH) 406 is used to transmit the control message 120 and, therefore, includes the device specific control information 125 and the common location dependent control information 118. The PDSCH 404 includes time-frequency resources (communication resource elements) that convey the data 122, 124 and, therefore, includes the UE data 122 and the MTC data 124. Accordingly, the EPDCCH 406 is an example of the control channel 108 and the PDSCH 404 is an example of the data channel 106. In accordance with at least one revision of the 3GPP communication specification, the EPDCCH 406 uses resource elements within the block of resource elements that are allocated for UE data. Therefore, for the example, the portion of resource elements used for the EPDCCH are not used for the UE data.

The MTC data 124 is within the block of communication resource elements used for the UE data 122. The resource elements used for the MTC data are not used for the UE data. Therefore, the MTC data is "punctured" within the UE data. The signal transmission 400 may include data and control for other UE devices. For the example, UE 2 data for a second device and UE 3 data for a third device are included in the PDSCH 404.

Figure 5:
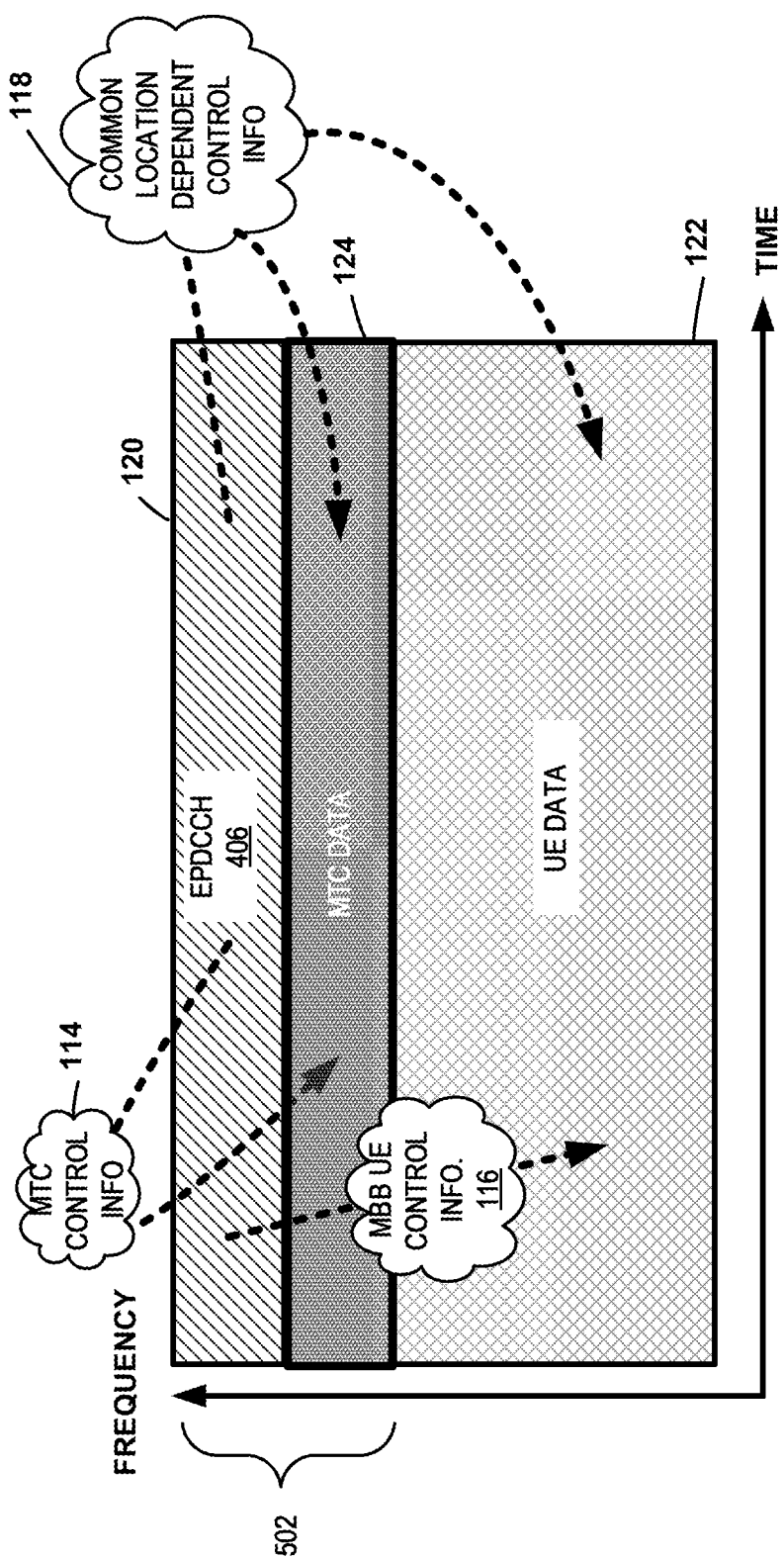
FIG. 5 is an illustration of a portion of the signal transmission that includes the UE data, MTC data, and the EPDCCH.

FIG. 5 is an illustration of a portion 500 of the signal transmission 400 that includes the UE data 122, MTC data 124 and the EPDCCH 406. The EPDCCH 406 includes the MTC control information 114, the UE control information 116 and the common location dependent control information 118. Both devices 110, 112 receive and decode the EPDCCH 406 to recover device specific control information and the common location dependent control information 118. The UE device 110 applies the UE specific control information 116 and the common location dependent control information 118 to recover the UE data 122. The MTC device 112 applies the MTC specific control information 114 and the common location dependent control information 118 to recover the MTC data 124. For the example of FIG. 4 and FIG. 5, the MTC device 112 can utilize a narrow band receiver to receive only portion 502 of the bandwidth typically reserved for the UE device 110. By arranging the MTC data 124 near the EPDCCH 406 in the transmission 400, only the subcarriers conveying the MTC data and the EPDCCH 406 need to be received by the MTC device 112. Since the resource elements of the MTC data and the resource elements of the EPDCCH are close to each other in frequency, only the narrow portion 502 is received. Accordingly, this example has the advantage of using a narrow band receiver as compared to examples where the entire PDCCH needs to be received.

For the example of FIG. 4 and FIG. 5, the control message 120 includes the MCS for the first data, the MCS for the second data, RV and NDI for the first data, RV and NDI for the second data, Hybrid-HARQ parameters for the first data and Hybrid-HARQ parameters for the second data, data location in the signal (which is the same for the first data and the second data), and MIMO and Transmission Mode parameters needed for spatial processing (which is the same for the first data and the second data). In some situations, additional information may be provided in the control message 120. For example, the relationship between the first data and the second data may be provided. Such information may include, for example, a block number of the audio stream matching to data block number of the video stream for data buffering at each device where one device provides video to a user and the other device is providing audio.

Figure 6:
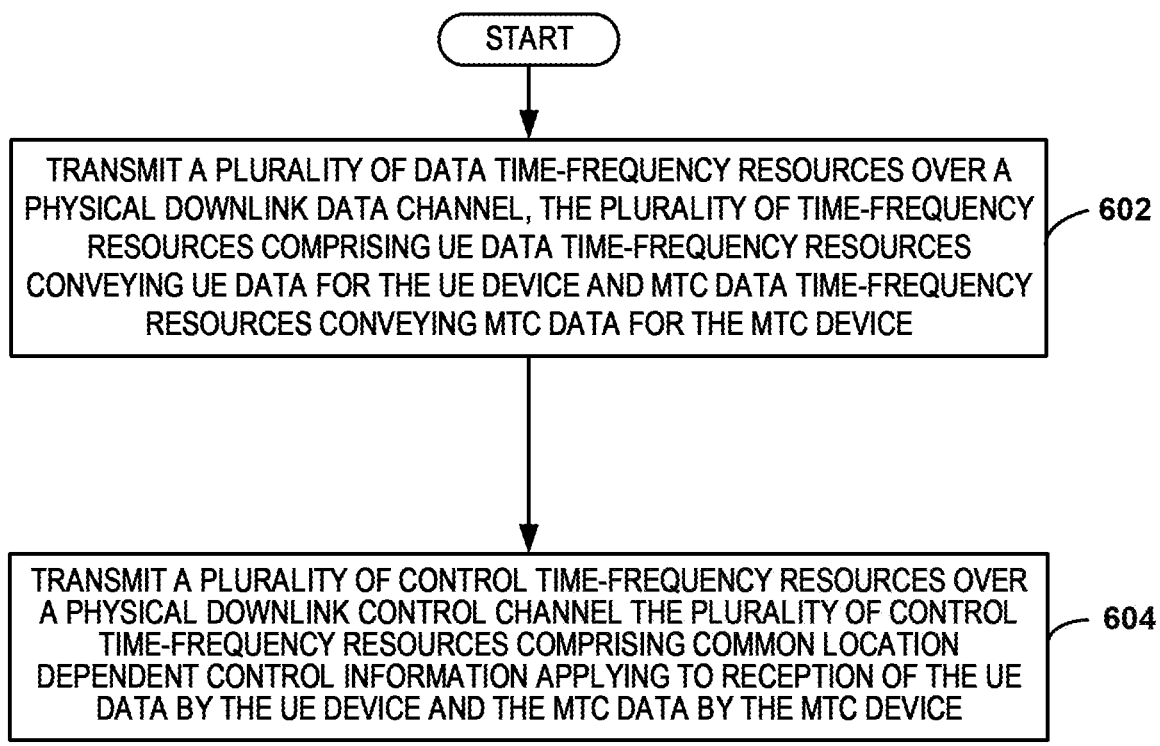
FIG. 6 is a flow chart of an example of a method of transmitting a transmission signal to a user equipment (UE) device and a machine type communication (MTC) device.

FIG. 6 is a flow chart of an example of a method of transmitting a transmission signal to a user equipment (UE) device and a machine type communication (MTC) device. The steps of FIG. 6 can be performed in a different order than shown and some steps may be combined into a single step. Additional steps may be performed and some steps may be omitted. For the example, the method is performed by the base station 102.

At step 602, a plurality of data time-frequency resources is transmitted over a physical downlink data channel. The plurality of time-frequency resources comprising UE data time-frequency resources conveying UE data for the UE device and MTC data time-frequency resources conveying MTC data for the MTC device. The UE data time-frequency resources conveying the UE data are a portion of available UE data time-frequency resources available for conveying UE data. The MTC data time-frequency resources conveying MTC data are unused UE data time-frequency resources of the available UE data time-frequency resources.

At step 604 a plurality of control time-frequency resources is transmitted over a physical downlink control channel. The plurality of control time-frequency resources comprising common location dependent control information applying to reception of the UE data by the UE device and the MTC data by the MTC device. The physical downlink control channel comprises UE control information applying to recovery of the UE data and identifying the UE data time-frequency resources and MTC control information applying to recovery of the MTC data and identifying the MTC data time-frequency resources.

The physical downlink control channel may be a Physical Downlink Control Channel (PDCCH) in accordance with at least one revision of The Third Generation Partnership Project (3GPP) Long Term Evolution (LTE) specification. The physical downlink data channel may be a Physical Downlink Shared Channel (PDSCH) in accordance with at least one revision 3GPP LTE communication specification. In some situations, the physical downlink control channel is an Enhanced Physical Downlink Control Channel (EPDCCH) in accordance with at least one revision of 3GPP LTE specification. As discussed above, the MTC data time-frequency resources can be arranged near in frequency to EPDCCH subcarriers. For example, the MTC data time-frequency resources can be adjacent in frequency to the EPDCCH subcarriers. Such a configuration allows the MT device to use a narrowband receiver.

In some circumstances, the MTC data layer control information comprises a MTC data present indicator indicating that the MTC data is present in the signal transmission and the MTC data is within a predetermined format known to the MTC device. The predetermined format may include a modulation coding scheme (MCS), a size of the MTC data; and time-frequency resources of the MTC data.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   transmitting a transmission signal to a user equipment (UE) device and a machine type communication (MTC) device, the transmitting of the transmission signal comprising:
   transmitting a plurality of data time-frequency resources over a physical downlink data channel, the plurality of time-frequency resources comprising UE data time-frequency resources conveying UE data for the UE device and MTC data time-frequency resources conveying MTC data for the MTC device; and
   transmitting a plurality of control time-frequency resources over a physical downlink control channel, the plurality of control time-frequency resources comprising common location dependent control information applying to reception of the UE data by the UE device and the MTC data by the MTC device.

2. The method of claim 1, wherein the UE data time-frequency resources conveying the UE data are a portion of available UE data time-frequency resources available for conveying UE data and wherein the MTC data time-frequency resources conveying MTC data are unused UE data time-frequency resources of the available UE data time-frequency resources.

3. The method of claim 1, wherein the physical downlink control channel comprises:
   UE control information applying to recovery of the UE data and identifying the UE data time-frequency resources; and
   MTC control information applying to recovery of the MTC data and identifying the MTC data time-frequency resources.

4. The method of claim 3, wherein the physical downlink control channel is a Physical Downlink Control Channel (PDCCH) in accordance with at least one revision of The Third Generation Partnership Project (3GPP) Long Term Evolution (LTE) specification.

5. The method of claim 3, wherein the physical downlink data channel is Physical Downlink Shared Channel (PDSCH) in accordance with at least one revision of The Third Generation Partnership Project (3GPP) Long Term Evolution (LTE) specification.

6. The method of claim 5, wherein the physical downlink control channel is an Enhanced Physical Downlink Control Channel (EPDCCH) in accordance with the at least one revision of 3GPP LTE specification.

7. The method of claim 6, wherein the MTC data time-frequency resources are arranged near in frequency to EPDCCH subcarriers for the EPDCCH.

8. The method of claim 7, wherein the MTC data time-frequency resources are arranged adjacent in frequency to the EPDCCH subcarriers.

9. The method of claim 1, wherein:
   the MTC data layer control information comprises a MTC data present indicator indicating that the MTC data is present in the signal transmission; and
   the MTC data is within a predetermined format known to the MTC device, the predetermined format comprising:
   a modulation coding scheme (MCS);
   a size of the MTC data; and
   a time-frequency resources of the MTC data.

10. The method of claim 9, wherein the predetermined format further comprises common spatial resources of the UE data and the MTC data.

11. The method of claim 1, wherein the common location dependent control information comprises multiple input multiple output (MIMO) parameters.

12. A base station comprising:
a transmitter configured to transmit, a transmission signal to a user equipment (UE) device and to a machine type communication (MTC) device, the transmission signal comprising:
a physical downlink data channel comprising a plurality of time-frequency resources comprising UE data time-frequency resources conveying UE data for the UE device and MTC data time-frequency resources conveying MTC data for the MTC device; and
a physical downlink control channel comprising common location dependent control information applying to reception of the UE data by the UE device and the MTC data by the MTC device.

13. The base station of claim 12, wherein the UE data time-frequency resources conveying the UE data are a portion of available UE data time-frequency resources available for conveying UE data and wherein the MTC data time-frequency resources conveying MTC data are unused UE data time-frequency resources of the available UE data time-frequency resources.

14. The base station of claim 12, wherein the physical downlink control channel comprises:
UE control information applying to recovery of the UE data and identifying the UE data time-frequency resources; and
MTC control information applying to recovery of the MTC data and identifying the MTC data time-frequency resources.

15. The base station of claim 14, wherein:
the physical downlink data channel is Physical Downlink Shared Channel (PDSCH) in accordance with at least one revision of The Third Generation Partnership Project (3GPP) Long Term Evolution (LTE) specification;
the physical downlink control channel is an Enhanced Physical Downlink Control Channel (EPDCCH) in accordance with the at least one revision of 3GPP LTE specification; and
the MTC data time-frequency resources are arranged near in frequency to EPDCCH subcarriers for the EPDCCH.

16. The base station of claim 15, wherein the MTC data time-frequency resources are arranged adjacent in frequency to the EPDCCH subcarriers.

17. The method of claim 1, wherein transmitting the transmission signal to the UE device and the MTC device comprises:
transmitting a same transmission signal to the UE device and the MTC device.

18. The base station of claim 12, wherein the transmitter is further configured to transmit a same transmission signal to the UE device and the MTC device.

19. The method of claim 1, wherein the common location dependent control information is based on the UE device and the MTC device being near a same location.

20. The base station of claim 12, wherein the common location dependent control information is based on the UE device and the MTC device being near a same location.

* * * * *